United States Patent
Yang et al.

(10) Patent No.: US 6,572,074 B2
(45) Date of Patent: Jun. 3, 2003

(54) ELECTROMECHANICAL VALVE ACTUATOR WITH AIR PISTON TO AID IN SOFT LANDING

(75) Inventors: Woong-chul Yang, Ann Arbor, MI (US); Mohammad Haghgooie, Ann Arbor, MI (US); James Thomas Kovach, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 89 days.

(21) Appl. No.: 09/681,504

(22) Filed: Apr. 18, 2001

(65) Prior Publication Data

US 2002/0153501 A1 Oct. 24, 2002

(51) Int. Cl.⁷ .............................................. F16K 31/02
(52) U.S. Cl. ................. 251/54; 251/129.1; 251/129.16; 123/90.11; 335/240
(58) Field of Search ................ 251/54, 129.1, 251/129.16; 123/90.11; 335/240

(56) References Cited

U.S. PATENT DOCUMENTS

| | | | |
|---|---|---|---|
| 4,067,667 A | 1/1978 | White | |
| 4,515,343 A | 5/1985 | Pischinger et al. | |
| 4,883,025 A | 11/1989 | Richeson | |
| 5,223,812 A * | 6/1993 | Kreuter | 251/129.1 X |
| 5,762,035 A * | 6/1998 | Schebitz | 123/90.11 |
| 5,832,883 A | 11/1998 | Bae | |
| 5,988,124 A | 11/1999 | Duesmann | |
| 6,101,992 A * | 8/2000 | Pischinger et al. | 123/90.11 |

FOREIGN PATENT DOCUMENTS

DE        297 03 584 U1 *  8/1998  ............. H01F/7/13

* cited by examiner

Primary Examiner—Ehud Gartenberg
Assistant Examiner—Eric Keasel
(74) Attorney, Agent, or Firm—Dykema Gossett PLLC; Carlos L. Hanze

(57) ABSTRACT

An electromagnetic actuator 10 for opening and closing a cylinder valve 14. The actuator includes an opening coil 20, a closing coil 22, a magnetic armature 26 which is disposed between coils 20, 22 and which is fixedly attached to the stem or shaft portion 28 of valve 14, a pair of conventional valve springs 30, 32, and a pair of pneumatic dampers or air cushioning assemblies 34, 36. Pneumatic dampers 34, 36 are effective to selectively decelerate the moving components of the actuator as they approach their respective seats during valve opening and valve closing events, thereby substantially reducing noise and vibration harshness ("NVH").

2 Claims, 3 Drawing Sheets

ELECTROMECHANICAL VALVE ACTUATOR WITH AIR PISTON TO AID IN SOFT LANDING

BACKGROUND OF INVENTION

This invention relates to an electromechanical valve actuator and more particularly, to an electromechanical valve actuator having integrated air cushioning pistons or assemblies which are effective to selectively decelerate the moving components of the actuator as they approach their respective seats, thereby providing a "soft landing" for the components and substantially reducing or eliminating hammering effects and noise and vibration harshness ("NVH").

Valve actuator assemblies and systems are used in internal combustion engines in order to open and close the engine's intake and/or exhaust valves. Prior valve timing systems typically include one or more camshafts which selectively engage the valves thereby causing the valves to open and close according to a certain timing sequence or strategy. Efforts have been made to increase the efficiency of vehicle engines and reduce emissions by eliminating the camshafts and operating the intake and exhaust valves by use of selectively controllable electromagnetic or electromechanical valve actuators.

Electromechanical valve actuators allow for independent control of the valve timing with respect to the vehicle's crankshaft. This independence allows for optimization of the exhaust and intake valve timing events at all engine operating conditions. Controlling the intake valve events can eliminate the need for throttling the engine, which can provide a significant reduction in fuel consumption. Optimizing valve timing over the engine speed range can provide a "flatter" and more efficient torque curve than is possible with a conventional cam system, which is a compromise between "low RPM" and "high RPM" operation. Other advantages of the electromechanical valve actuators and camless systems include the elimination of external "EGR" and throttling subsystems, enabling of Drive by Valve ("DBV") systems which provide a fast response for torque demand, the selective activation and deactivation of individual cylinders in a variable displacement engine (deactivation of individual cylinders), and the valve timing of a Miller cycle engine.

A typical electromagnetic or electromechanical valve includes a closing magnetic coil, an opening magnetic coil, an armature, and two substantially identical springs. When the coils are de-energized, the two springs are compressed equally and the armature resides "midway" between the coils. In order to open the valve, the opening coil is energized, thereby attracting the armature and holding the valve in an open position. In order to close the valve, the holding current to the opening coil is "switched off" and the valve spring force accelerates the valve toward its seat. At the midpoint of travel, the spring forces change direction and decelerate the valve. In order to assure that the valve will seat, the closing coil is energized and pulls the armature upward, thereby closing the valve.

Controlling the valve velocity as it contacts its seat (i.e., the "seating velocity") is important to ensure smooth valve operation. Particularly, if the seating velocity is not reduced to achieve a relatively soft landing, the impact can result in a "hammering effect" which can cause an unacceptable level of NVH and increased degradation of the actuator, valves, and valve seats. Controlling the valve velocity during valve opening events is similarly important for similar reasons. Particularly, it is important to reduce the velocity of the valve as it opens to soften the impact of components of the valve actuator against each other which occurs when the valve is fully opened.

There is therefore a need for a new and improved electromechanical or electromagnetic valve actuator which includes cushioning assemblies or devices which soften the landing of the valve actuating components and substantially reduce "hammering effects" and NVH.

SUMMARY OF INVENTION

A first non-limiting advantage of the invention is that it provides an electromagnetic or electromechanical valve actuator which substantially reduces NVH during opening and closing events.

A second non-limiting of the invention is that it includes one or more integrated cushioning pistons or assemblies which are effective to selectively decelerate the moving components of the actuator as they approach their respective seats, thereby providing a "soft landing" for the components and substantially reducing or eliminating hammering effects and noise vibration harshness.

According to a first aspect of the present invention, an electromagnetic actuator is provided for use in opening and closing a cylinder valve having a shaft. The actuator includes a closing coil; an opening coil; an armature which is coupled to the shaft of the valve and which is disposed between the closing coil and the opening coil; a housing which is coupled to the closing coil; and a pneumatic damper which is contained within the housing and which is effective to decelerate the valve during a valve closing event.

According to a second aspect of the present invention, a method is provided for reducing noise and vibration harshness in a electromechanical valve actuator of the type which selectively opens and closes a cylinder valve having a shaft. The method includes the steps of providing a housing having an internal bore; providing a piston; attaching the piston to the shaft of the valve; and causing the piston to be slidably disposed within the internal bore, effective to provide a deceleration force to the valve during a valve closing event.

These and other features, aspects, and advantages of the invention will become apparent by reading the following specification and by reference to the following drawings.

DETAILED DESCRIPTION

Figure 1:
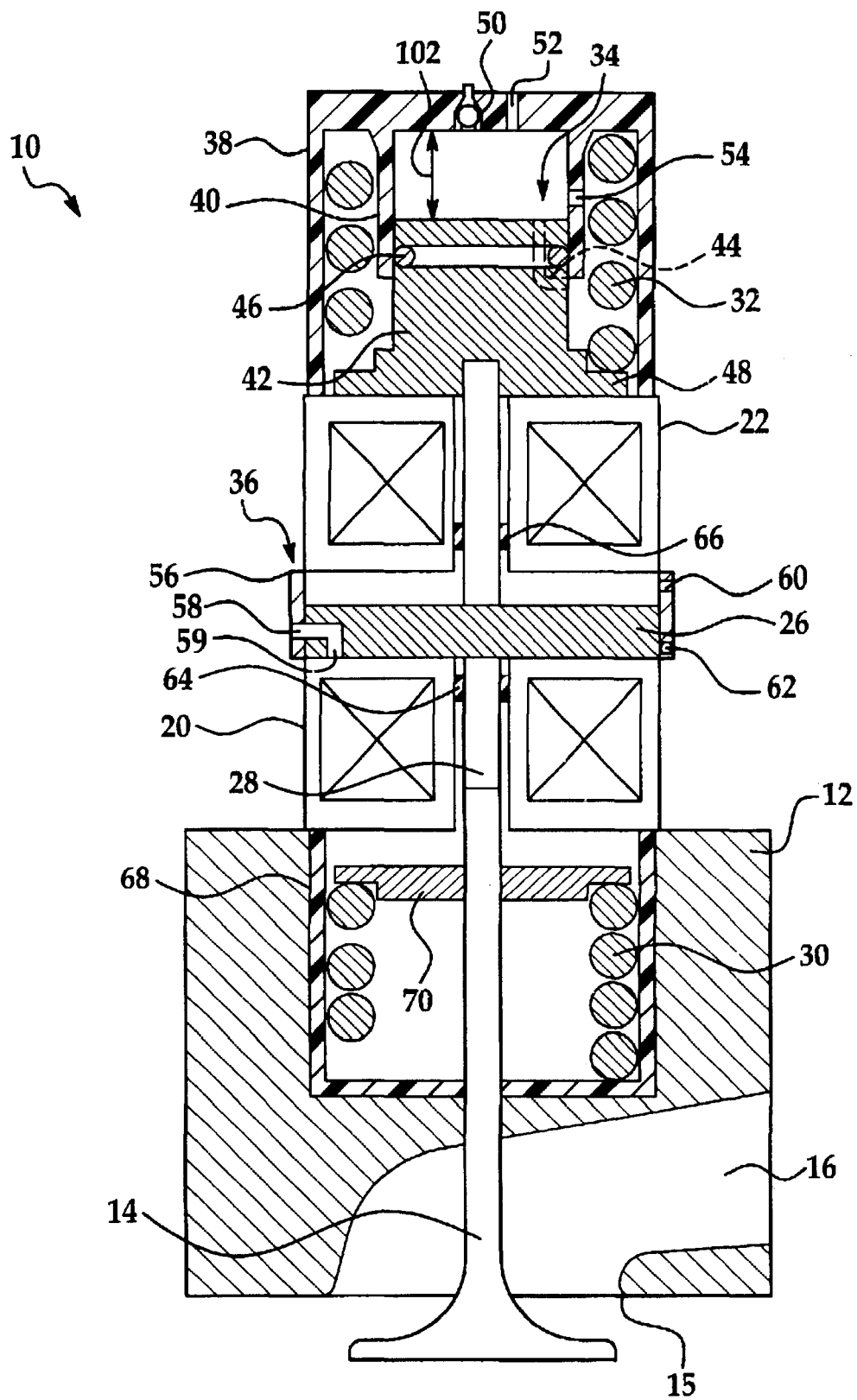
FIG. 1 is a sectional view of an electromechanical valve actuator which is made in accordance with the teachings of the preferred embodiment of the invention.

Referring now to FIG. 1, there is shown an electromagnetic or electromechanical valve actuator or assembly 10 which is made in accordance with the teachings of the preferred embodiment of the invention and which is adapted for use in combination with an internal combustion engine of the type having several substantially identical cylinders 12. Each cylinder 12 includes at least one intake valve 14 which selectively delivers an air and fuel mixture to cylinder 12 through intake port 16. The cylinder 12 will also include at least one exhaust valve (not shown) which selectively discharges exhaust gasses from the cylinder 12 through a discharge port. While the operation of valve actuator 10 is discussed with respect to intake valve 14, it should be appreciated that valve actuator 10 is also suited for use with exhaust valves and will function in a substantially identical manner and will provide substantially identical benefits for exhaust valve operation.

Actuator 10 includes an opening coil 20, a closing coil 22, a magnetic armature 26 which is disposed between coils 20, 22 and which is fixedly attached to the stem or shaft portion 28 of valve 14, a pair of conventional valve springs 30, 32, and a pair of pneumatic dampers or air cushioning assemblies 34, 36.

A generally cylindrical upper housing 38 is coupled to and disposed above coil 22. Housing 38 includes an integrally formed cylindrical bore 40, spring 32 which is coiled and/or disposed around bore 40, and a piston 42 which is slidably disposed within bore 40. Piston 42 is fixedly attached to valve stem 28 and includes a venting passage 44, which extends from the top surface of piston 42 to the side surface of the piston 42, an annular sealing and lubricating ring 46, which engages the inner surface of bore 40 and prevents air within bore 40 from escaping around piston 42, and a top flange or annular ridge 48 which is abuttingly engaged by the bottom side or end of spring 32. The piston 42 is preferably designed so as to minimize its mass. For example and without limitation, the piston 42 may be made from low-density materials such as aluminum, magnesium, titanium, or composites. The top side or end of spring 32 abuttingly engages the top surface of housing 38. A venting aperture 54 is formed in the side of bore 40 and selectively communicates with venting passage 44 when piston 42 reaches a certain position in the valve closing stroke (i.e., near the end of the valve closing stroke), thereby allowing air to exit through aperture 54. Bore 40 and piston 42 cooperatively form air cushioning assembly 34, which is effective to selectively decelerate valve 14 as it approaches valve seat 15, as discussed more fully and completely below.

A check valve 50 is disposed within the top surface of housing 38 and allows air to enter bore 40 during valve opening, while preventing air from exiting bore 40 during valve closing. A small orifice 52 is also formed within the top surface of housing 38 to regulate the pressure within bore 40.

A generally cylindrical housing or chamber 56 is disposed between and is fixedly coupled to coils 20, 22. Armature 26 is slidably disposed within housing 56 and includes a venting passage 59 which extends from the bottom surface of the armature 26 to the side surface of the armature 26. Housing 56 includes a venting aperture 58 which is formed in the side of the housing and which selectively communicates with venting passage 59 when armature 26 reaches a certain position in the valve opening stroke (i.e., near the end of the valve opening stroke). A small orifice 60 and check valve 62 are also formed within the side of housing 56. Orifice 60 regulates the pressure within housing 56 and check valve 62 allows air to enter housing 56 during a valve closing stroke, while preventing air from escaping housing 56 during a valve opening stroke. A pair of conventional seals 64, 66 are respectively disposed between coils 20 and 22 and shaft 28 and prevent air from escaping from housing 56 around shaft 28.

In one non-limiting embodiment of the invention, orifice 60, check valve 62, and seals 64, 66 are eliminated, and the small gaps between shaft 28 and coils 20, 22 are designed and/or sized so as to allow air to selectively enter and exit housing 56 at a certain desired rate, thereby regulating the pressure within housing 56. In another non-limiting embodiment, cushioning assembly 36 is eliminated by removing passage 59, aperture 58, orifice 60, check valve 62, and seals 64, 66, and cushioning is performed only during valve closing events by use of assembly 34.

Armature 26 and housing 56 cooperatively form air cushioning assembly 36, which is effective to selectively decelerate armature 26 as it approaches coil 20 during a valve opening stroke, as discussed more fully and completely below.

A generally cylindrical lower housing or chamber 68 is coupled to and disposed below coil 20. Housing 68 includes spring 30. The bottom side or end of spring 30 abuttingly engages the bottom surface of housing 68 and the top side or end of spring 30 abuttingly engages flange 70 which is coupled to shaft 28. In one non-limiting embodiment, housings 38, 56 and 68 are integrally formed together as a single structure and encompass the entire assembly 10.

In the preferred embodiment, coils 20, 22 are communicatively coupled to a conventional controller (not shown) which selectively controls the timing and energizing of coils 20, 22 in a conventional manner, effective to cause valve 14 to open and close according to a predetermined or calculated timing sequence. In one non-limiting embodiment, coils 20, 22 may be communicatively coupled to a portion of a conventional engine control unit ("ECU").

In operation, to close valve 14, closing coil 22 is energized, thereby attracting armature 26 and moving valve 14 and piston 42 in an upward direction. When valve 14 is in an open state, spring 30 is compressed and provides a closing assist force which further causes valve 14 to move in an upward direction. As the piston 42 moves upward during the valve-closing stroke, air is forced out of the bore 40 through the bore vent hole 54 as well as through the piston vent passage 44 and the pressure in the bore 40 stays atmospheric. When the piston 42 moves upward so as to block off the bore vent hole 54, the bottom of the bore wall blocks off the side of the piston venting passage 44 at the same time. As the piston 42 continues to travel upward, the air in the bore 40 is compressed, thereby decelerating the valve and armature 26. Check valve 50 will stay closed during valve closing and orifice 52 will regulate the pressure within bore 40. As the valve and piston continue to move upward, the trapped air in the cylinder is compressed which helps in decelerating the valve 14 as it approaches the valve seat 15 and cushioning the impact between valve 14 and valve seat 15. The decelerating force increases with piston velocity since the faster the piston is moving, the less time the air has to escape or "leak out" of bore 40 and the higher the pressure will be at a given piston position.

Before the valve 14 contacts its seat 15, the side of the piston 42 venting passage 44 aligns with the bore vent hole 54 so as to allow air to escape from the bore 40, thereby reducing the pressure above the piston 42. This venting reduces the holding current that is required in the closing coil 22, thus lowering the power consumption.

In order to open the valve 14, the current to the closing coil 22 is regulated to zero and the compressed opening spring 32 provides an opening assist force which begins to force open the valve 14. As the piston 42 moves downward, the pressure within bore 40 drops. The pressure drop opens the check valve 50 thus preventing significant vacuum formation within bore 40, which would retard the valve opening.

As the valve 14 and armature 26 move downward during the valve opening stroke, air is forced out of the housing 56 through the bore vent hole 58 and the pressure in the housing 56 stays atmospheric. When the armature 26 moves downward, it blocks off the vent hole 58. As the armature 26 continues to travel downward, the air below the armature 26 in housing 56 is compressed, thereby decelerating the valve 14 and armature 26. Check valve 62 will stay closed during valve opening and orifice 60 will prevent a vacuum from forming above armature 26 and regulates the pressure within housing 56. As the valve 14 and armature 26 continue to move downward, the trapped air in the housing 56 is compressed which helps in decelerating the armature 26 as it approaches coil 20 and cushioning the impact of armature 26 against coil 20. The decelerating force increases with velocity since the faster the armature 26 is moving, the less time the air has to escape or "leak out" of housing 56 and the higher the pressure will be at a given armature position.

Before the armature 26 contacts coil 20, the side of the armature venting passage 59 aligns with the vent hole 58 so as to allow air to escape from the housing 56, thereby reducing the pressure below armature 26. This venting reduces the holding current that is required in the opening coil 20, thus lowering the power consumption.

Figure 2:
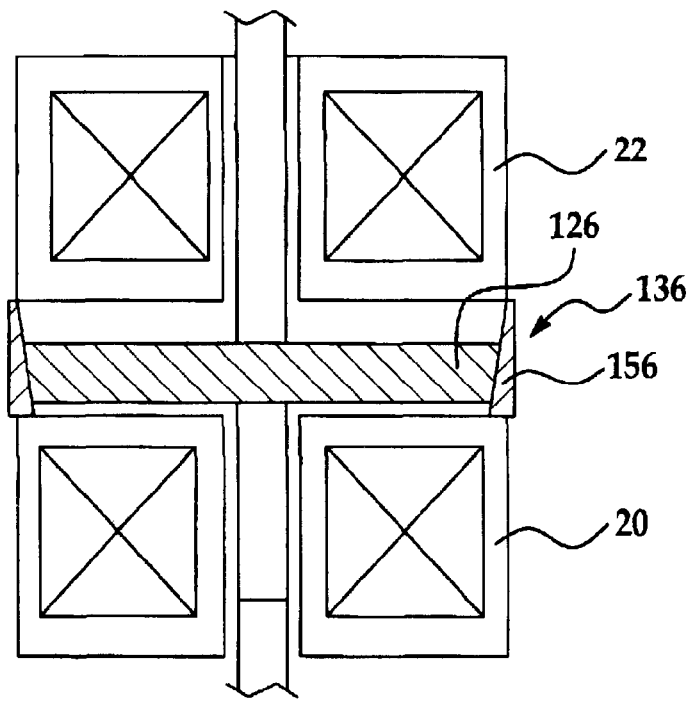
FIG. 2 is a sectional view of an armature cushioning assembly for use within an electromechanical valve actuator and which is made in accordance with the teachings of a second embodiment of the invention.

In a second embodiment of the invention, shown in FIG. 2, a different air cushioning mechanism 136 is used to decelerate the valve 14 during a valve opening stroke. Particularly, in this embodiment housing 56 is replaced with housing 156 and armature 26 is replaced with armature 126. The outer circumference of armature 126 is tapered inward from the top of the armature 126 to the bottom of the armature 126. The inner surface of the housing 156 is also tapered inward to conform with the outer surface of the armature 126. As the armature 126 moves downward during valve opening, the space between armature 126 and housing 156 gradually decreases, thereby causing less air to escape from below armature 126 and providing a cushioning effect.

Figure 3:
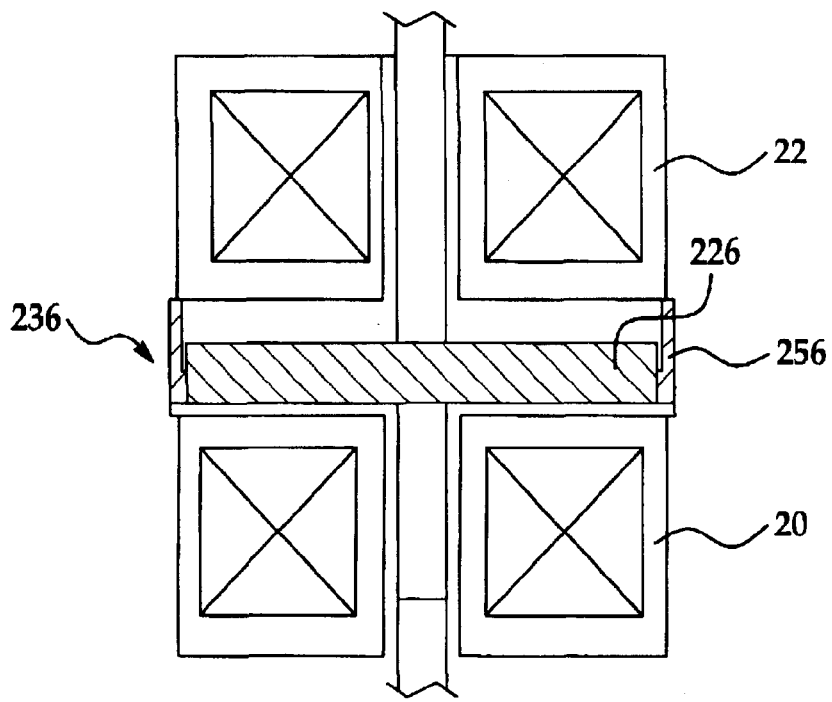
FIG. 3 is a sectional view of an armature cushioning assembly for use within an electromechanical valve actuator and which is made in accordance with the teachings of a third embodiment of the invention.

In a third embodiment of the invention, shown in FIG. 3, a different air cushioning mechanism 236 is used to decelerate the valve during a valve opening stroke. Particularly, in this embodiment housing 56 is replaced with housing 256 and armature 26 has been replaced with armature 226. The inner surface of the housing 256 is "stepped" inward. Particularly, the inner surface of the "bottom" of housing 256 has a diameter which is substantially identical to the diameter of armature 226 and which is smaller than the diameter of the inner surface of the "top" of housing 256. As the armature 226 moves downward during valve opening, air is allowed to escape around armature 226 until armature 226 reaches the inwardly stepped portion housing 256 at which time, the air below armature 226 will be compressed, thereby providing a cushioning effect.

Figure 4:
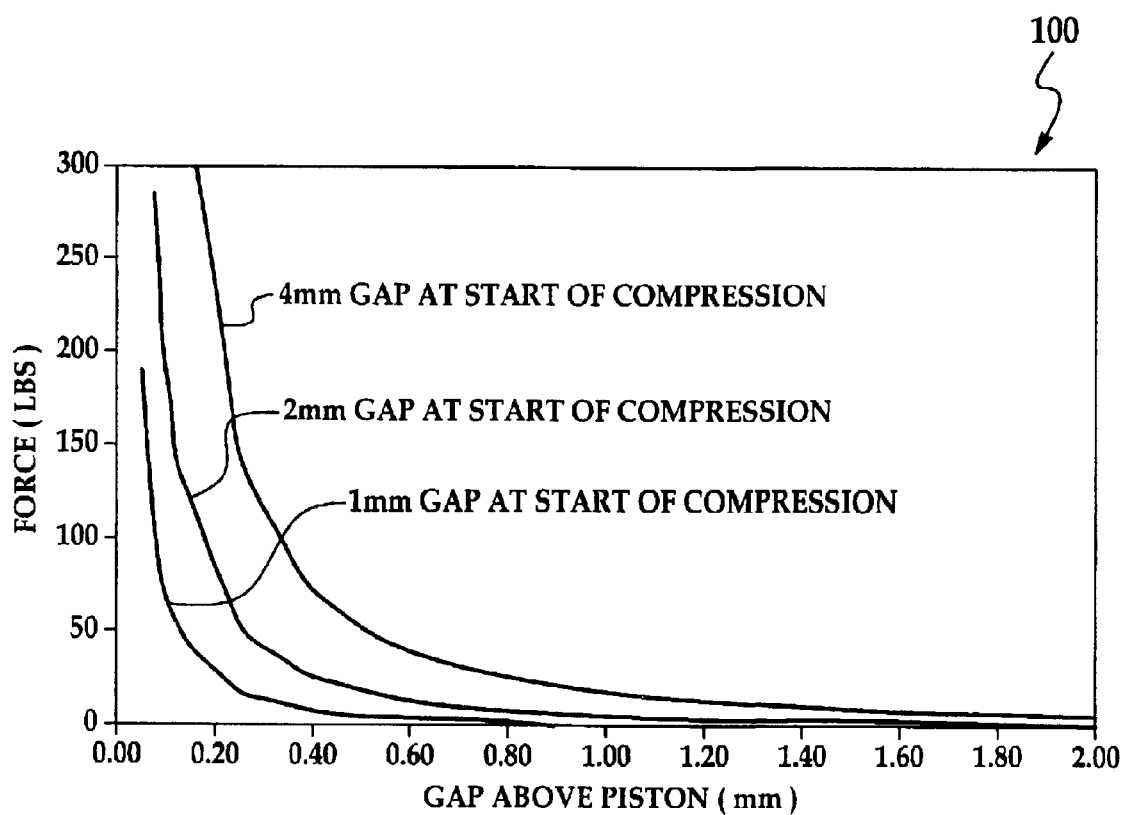
FIG. 4 is a graph illustrating the deceleration force provided by a pneumatic damper used within one non-limiting embodiment of the invention versus the size of the gap above the damper piston.

Referring now to FIG. 4, there is shown a graph 100 of pressure force as a function of piston position for one non-limiting example of the present invention, which utilizes a 13 mm diameter piston. The graph 100 assumes adiabatic pressure with zero leakage around the piston. The gap referred to in the graph 100 is the gap 102 between the top of the piston and the top surface of bore 40, shown in FIG. 1. It should be appreciated that with air leakage, the pressure build-up would be somewhat lower. The piston/ring and the diameter of the orifice (if required) can be designed to control the air leakage and, therefore, the force versus valve position characteristics of the system.

13 mm diameter piston can significantly reduce the valve closing velocity. The average velocity of a valve during the closing stroke is about 4 m/sec. If a typical system were decelerated from a 2 mm gap at the start of compression to a 0.1 mm gap at the valve-closed position, the velocity would be reduced by about 1 m/sec assuming adiabatic compression with deceleration effect of spring forces not included. A greater reduction in velocity would be realized if the compression started at larger gaps.

It is to be understood that the invention is not to be limited to the exact construction and/or method which has been illustrated and discussed above, but that various changes and/or modifications may be made without departing from the spirit and the scope of the invention.

What is claimed is:

1. An electromagnetic actuator for use in opening and closing a cylinder valve having a shaft, said actuator comprising:
   a closing coil;
   an opening coil;
   an armature which is coupled to said shaft of said valve and which is disposed between said closing coil and said opening coil;
   a housing which is coupled to said closing coil; and
   a pneumatic damper which is contained within said housing and which is effective to decelerate said valve during a valve closing event, with said pneumatic damper comprising:
   an internal bore which is formed within said housing and a piston which is fixedly attached to said shaft of said valve and which is slidably disposed within said internal bore, with said piston having a venting passage which is formed within said piston, and with said bore having a venting orifice which is formed within said bore and which selectively communicates with said venting passage when said valve is in a substantially closed position, thereby allowing air compressed within said bore to be released;
   a check valve which is formed within said housing and which is effective to allow air to enter into said bore during a valve opening event, while substantially preventing air from escaping said bore during a valve closing event; and
   an orifice which is formed within said housing and which is effective to regulate pressure within said bore.

2. The electromagnetic value actuator of claim 1 wherein said piston further includes an annular sealing ring engages an inner surface of said bore.

* * * * *